(12) United States Patent
Kokuryo et al.

(10) Patent No.: US 7,019,321 B2
(45) Date of Patent: Mar. 28, 2006

(54) SENSING DEVICE AND ITS SENSING METHOD, AND WIPER CONTROLLING APPARATUS USING THE SAME

(75) Inventors: Kazuto Kokuryo, Otsu (JP); Shinji Nagao, Otsu (JP)

(73) Assignee: Niles Co., Ltd., Tokyo (JP)

( * ) Notice: Subject to any disclaimer, the term of this patent is extended or adjusted under 35 U.S.C. 154(b) by 301 days.

(21) Appl. No.: 10/250,467

(22) PCT Filed: Jan. 9, 2002

(86) PCT No.: PCT/JP02/00024

§ 371 (c)(1),
(2), (4) Date: Jul. 2, 2003

(87) PCT Pub. No.: WO02/055351

PCT Pub. Date: Jul. 18, 2002

(65) Prior Publication Data

US 2004/0113578 A1    Jun. 17, 2004

Related U.S. Application Data

(60) Provisional application No. PCT/JP02/00024, filed on Jan. 9, 2002.

(30) Foreign Application Priority Data

Jan. 10, 2001    (JP)    ............................. 2001-002863
Dec. 27, 2001    (JP)    ............................. 2001-397837

(51) Int. Cl.
*G01N 15/06*    (2006.01)
(52) U.S. Cl. ...................... 250/574; 250/573; 318/483; 356/436; 356/445

(58) Field of Classification Search ................ 250/573, 250/574; 356/436, 445; 318/483
See application file for complete search history.

(56) References Cited

U.S. PATENT DOCUMENTS 5,319,293 A * 6/1994 Levers ........................ 318/483

(Continued)

FOREIGN PATENT DOCUMENTS

EP    0 997 360    5/2000

(Continued)

*Primary Examiner*—David Porta
*Assistant Examiner*—Stephen Yam
(74) *Attorney, Agent, or Firm*—Hamre, Schumann, Mueller & Larson, P.C.

(57) ABSTRACT

In a rain sensing device, a sensing device that can estimate the size of raindrops or the like without a large amount of hardware resources, and its sensing method, and a wiper controlling apparatus using the same can be provided. In a sensing device, light emitted from a light-emitting member is introduced to a transparent plate, reflected by a sensing surface of the transparent plate and then received by a photo-detector, thereby detecting a condition of the sensing surface. The sensing device includes a sampling part for sampling signals from the photo-detector, a compression part for compressing signals in a sequence of the sampled signals when they continue within a single segment, where a plurality of the segments defined by a plurality of predetermined values are set with respect to an input signal, a calculation part for calculating a compressibility from the number of the sampled signals to be compressed by the compression part and the number of the sampled signals that have been compressed thereby, and a judging part for judging the condition of the sensing surface based on the compressibility.

20 Claims, 14 Drawing Sheets

U.S. PATENT DOCUMENTS

| | | | |
|---|---|---|---|
| 5,838,454 A | 11/1998 | Pientka | 356/445 |
| 6,084,519 A * | 7/2000 | Coulling et al. | 340/602 |
| 6,118,383 A | 9/2000 | Hegyi | 340/602 |
| 6,144,022 A * | 11/2000 | Tenenbaum et al. | 250/208.1 |
| 6,207,967 B1 | 3/2001 | Hochstein | 250/574 |
| 6,376,824 B1 | 4/2002 | Michenfelder et al. | 250/214 R |

FOREIGN PATENT DOCUMENTS

| | | |
|---|---|---|
| EP | 1 113 260 | 7/2001 |
| FR | 2 787 406 | 6/2000 |
| JP | 2-68248 | 3/1990 |
| JP | 10-186059 | 7/1998 |
| WO | 00/37292 | 6/2000 |

\* cited by examiner

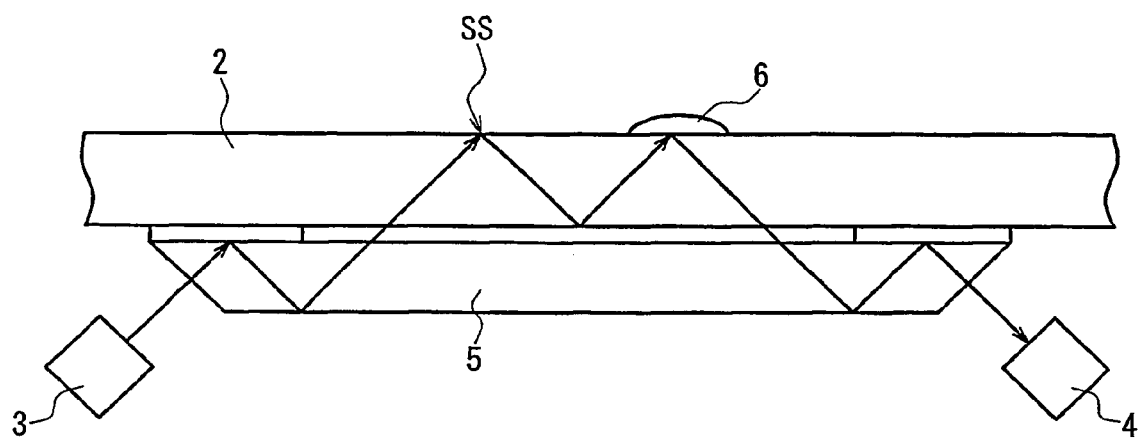
F I G. 1

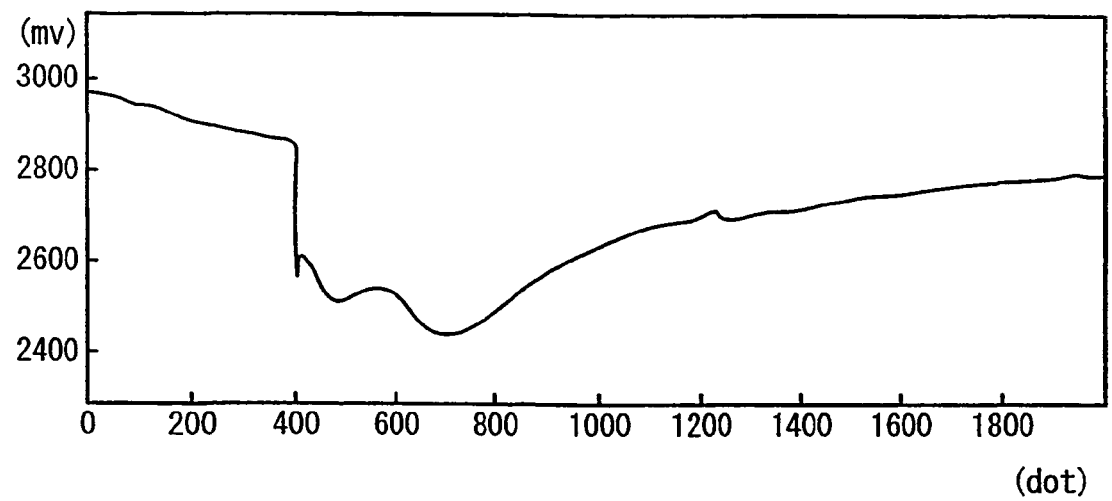
F I G. 3A
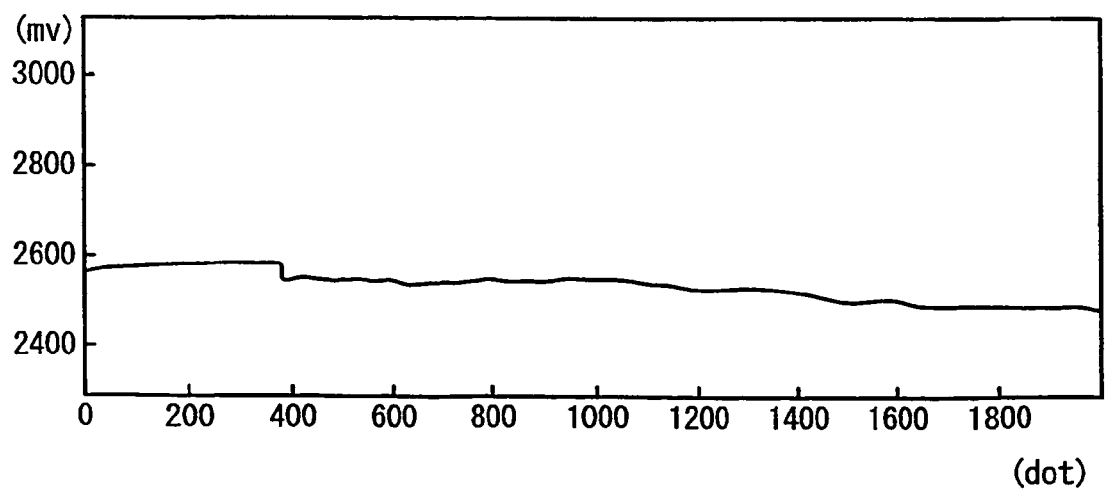
F I G. 3B

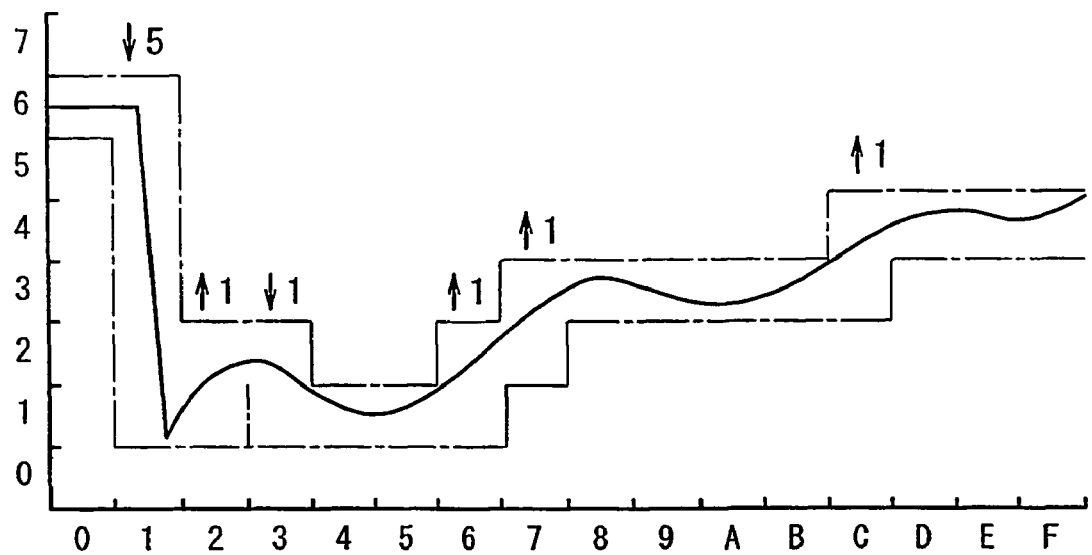
F I G. 6A
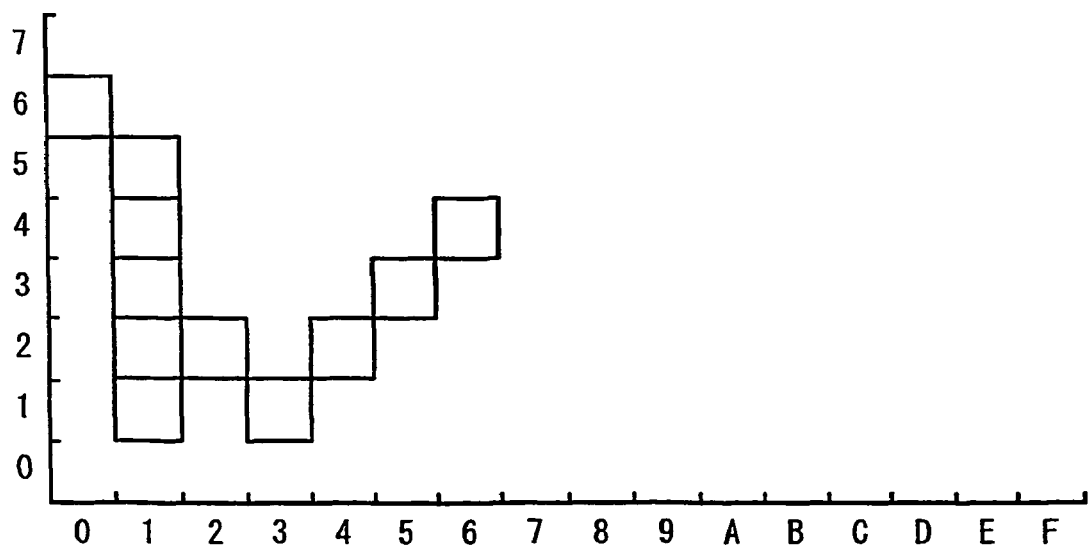
F I G. 6B

SENSING DEVICE AND ITS SENSING METHOD, AND WIPER CONTROLLING APPARATUS USING THE SAME

TECHNICAL FIELD

The present invention relates to a device for sensing a target object, such as a water droplet, dropped on a sensing surface and a method therefor. In particular, the present invention relates to a rain sensing device for vehicles and a method therefor. The present invention further relates to a wiper controlling apparatus using the same.

BACKGROUND ART

Conventionally, many sensing devices of these types have been suggested. For example, an apparatus employing an optical method described below is known. Light emitted from a photo emission element is introduced to a transparent plate, reflected by a sensing surface of the transparent plate, and then received by a photo-detector, thereby detecting raindrops. In other words, when water or the like exists on the sensing surface, the reflection condition of this surface changes, so that light quantity entering the photo-detector decreases. A conventional object sensor senses an object by recognizing this change.

Conventionally, such recognition of changes often has been made by comparison with a reference value (for example, JP 10-186059 A (1998)).

Since these rain sensing devices are used under various conditions in practice, counter measures have to be taken to prevent their malfunction. Foe example, a plurality of reference values are set according to various modes (see JP 10-186059 A (1998)), or the reference value is replaced and updated sequentially (see JP 2-68248 A (1990)).

In these raindrop sensing devices described above, the logic of sensing raindrops has become more complex, thus making it difficult to process the detection judgement at a high speed. Furthermore, all these methods basically judge the condition of the sensing surfaces and detect raindrops by comparison with the reference values. Therefore, owing to an influence of external light and conditions of the sensing surface such as dirt, it has been difficult to prevent the malfunction.

Moreover, in general rain sensing devices for vehicles, the size of the sensing surface is much smaller than that of the region to be wiped. Even though there is a relatively low probability that a particular raindrop will drop on such a small area, identifying certain features of the raindrop may allow the rain condition to be estimated. This makes it possible to control the wiper appropriately according to the rain condition. For this purpose, it is necessary to recognize the rain conditions by detecting the size of the sensed raindrops or the like.

For example, some kind of image processing based on data of a windshield glass would make it possible to recognize and identify the rain conditions. Realizing such an image processing requires expensive hardware resources such as a powerful CPU and a large amount of memory. However, in many cases, the hardware of the rain sensing devices to be mounted on vehicles needs to be inexpensive to meet the requirements of affordable costs and the like.

DISCLOSURE OF INVENTION

In view of the above, the object of the present invention is to provide a sensing device that can estimate the size of raindrops or the like without a large amount of hardware resources, and its sensing method, and a wiper controlling apparatus using the same.

A sensing device of the present invention, in which a light emitted from a light-emitting member is introduced to a transparent plate, reflected by a sensing surface of the transparent plate and then received by a photo-detector, thereby detecting a condition of an object that has impacted on the sensing surface, includes a sampling part for sampling signals from the photo-detector, a fluctuation sensing part for sensing a fluctuation of the signals from the photo-detector, and a judging part for judging the object based on a changing pattern of the signal fluctuation sensed by the fluctuation sensing part.

With the above configuration, a dynamic fluctuation of the signal of the photo-detector obtained through the object that has impacted on the sensing surface allows a dynamic jiggling of the object to be sensed indirectly. Furthermore, the changing pattern of the signal fluctuation allows the changing pattern of the object's jiggling determined by object's physical properties to be sensed indirectly, thus making it possible to judge the kind and condition of the object.

The above-mentioned sensing device can be configured as follows.

In the above-mentioned sensing device, the fluctuation sensing part can include a part for sensing a period of the signal fluctuation from a time the signal fluctuation is sensed to a time an attenuation of a degree of the signal fluctuation to a predetermined degree is sensed. The changing pattern of the signal fluctuation used in the judging part can be a changing pattern of the period of the signal fluctuation sensed in the fluctuation sensing part.

With the above configuration, the period of the signal fluctuation allows the period of the object's jiggling to be sensed indirectly. For example, when the object is a raindrop, since a larger raindrop jiggles for a longer period according to its physical property, the size of the raindrop can be estimated by the sensed period of jiggling.

Next, in the above-mentioned sensing device, the fluctuation sensing part can include a part for sensing a degree of the signal fluctuation. The changing pattern of the signal fluctuation used in the judging part may be a changing pattern of the degree of the signal fluctuation sensed in the fluctuation sensing part.

With the above configuration, the degree of the signal fluctuation allows the degree of the object's jiggling to be sensed indirectly. For example, when the object is a raindrop, since a larger raindrop jiggles a larger degree according to its physical property, the size of the raindrop can be estimated by the sensed degree of jiggling.

Furthermore, the above-mentioned sensing device can be configured as follows.

In the above-mentioned sensing device, the fluctuation sensing part can include, as the part for sensing the period of the signal fluctuation, a part for compressing signals in a sequence of the sampled signals when they continue within a single segment, where a plurality of the segments defined by a plurality of predetermined values are set with respect to an input signal, and a part for calculating a compressibility from the number of the sampled signals to be compressed by the part for compressing the signals and the number of the sampled signals that have been compressed thereby. The judging part can use the compressibility as a representation of the changing pattern of the period of the signal fluctuation so as to judge the object on the sensing surface.

With the above configuration, the period of the signal fluctuation can be sensed. Also, it is possible to reduce effectively a data amount of a signal portion without a substantial change in the sequence of the sampled signals. Furthermore, since the data of a signal portion necessary for a sensing operation are not compressed, the sensing accuracy will not be deteriorated.

Also, in the above-mentioned sensing device, the fluctuation sensing part can include, as the part for sensing the degree of the signal fluctuation, a part for calculating the number of times that signals in a sequence of the sampled signals change from one segment to another within a predetermined period, where a plurality of the segments defined by a plurality of predetermined values are set with respect to an input signal, and a part for calculating a direction of increase or decrease of the change and a change amount thereof. The judging part can use the number of times, the direction and the change amount as a representation of the changing pattern of the degree of the signal fluctuation so as to judge the object on the sensing surface.

With the above configuration, the degree of the signal fluctuation can be sensed. Also, it is possible to focus only on a portion with a substantial signal change, which indicates a change in the condition of the sensing surface, in the sequence of the sampled signals, and analyze this change, thereby detecting the change in condition of the sensing surface.

Moreover, the above-mentioned configurations of the sensing device can be combined.

In the above-mentioned sensing device, the fluctuation sensing part can include a part for compressing signals in a sequence of the sampled signals when they continue within a single segment, where a plurality of the segments defined by a plurality of predetermined values are set with respect to an input signal, and a part for calculating a compressibility from the number of the sampled signals to be compressed by the part for compressing the signals and the number of the sampled signals that have been compressed thereby, and senses a period of the signal fluctuation from a time the signal fluctuation is sensed to a time an attenuation of a degree of the signal fluctuation to a predetermined degree is sensed based on the compressibility. The fluctuation sensing part further can include a part for calculating the number of times that signals in the sequence of the sampled signals change from one segment to another within a predetermined period and a part for calculating a direction of increase or decrease of the change and a change amount thereof, and senses a degree of the signal fluctuation based on the direction of increase or decrease of the change and the change amount. The changing pattern of the signal fluctuation used in the judging part can be a changing pattern of the period of the signal fluctuation sensed in the fluctuation sensing part. The changing pattern of the signal fluctuation used in the judging part can be a changing pattern of the degree of the signal fluctuation sensed in the fluctuation sensing part.

With the above configuration, the period and degree of the signal fluctuation can be sensed. Also, it is possible to reduce effectively a data amount of a signal portion without a substantial change in the sequence of the sampled signals, while since the data of a signal portion necessary for a sensing operation are not compressed, a sensing accuracy will not be deteriorated. Moreover, it is possible to focus only a portion with a substantial signal change, which indicates a change in the condition of the sensing surface, in the sequence of the sampled signals, and analyze this change, thereby detecting the change in condition of the sensing surface.

If any of the sensing devices described above further includes a part for removing a noise from the signals from the photo-detector, it is possible to eliminate the influence of the noise, allowing a highly accurate sensing operation.

If a spike noise is removed in advance from the signals that are inputted to the part for removing the noise, a noise-removing accuracy improves.

One example of the part for removing the noise includes a part that averages a predetermined number of samples of sequentially inputted signals.

In any of the first to third sensing devices described above, a liquid drop can be sensed. The liquid drop includes, for example, any of a raindrop, a water droplet or a drizzle drop.

Next, a wiper controlling apparatus of the present invention is characterized by using the above-described sensing device of the present invention and controlling a wiper based on a judgement made by this sensing device.

Next, a sensing method of the present invention, in which a light emitted from a light-emitting member is introduced to a transparent plate, reflected by a sensing surface of the transparent plate and then received by a photo-detector, thereby detecting a condition of an object that has impacted on the sensing surface, includes the operations of sampling signals from the photo-detector, sensing a fluctuation of the signals from the photo-detector, and judging the object based on a changing pattern of the sensed signal fluctuation.

With the above method, a dynamic fluctuation of the signal of the photo-detector obtained through the object that has impacted on the sensing surface allows a dynamic jiggling of the object to be sensed indirectly. Furthermore, the changing pattern of the signal fluctuation allows the changing pattern of the object's jiggling determined by object's physical properties to be sensed indirectly, thus making it possible to judge the kind and condition of the object.

Then, a sensing method of the present invention further can include the operation of sensing a period from a time the signal fluctuation is sensed to a time an attenuation of a degree of the signal fluctuation to a predetermined degree is sensed in the operation of sensing the fluctuation of the signals. The changing pattern of the signal fluctuation used in the operation of judging the object can be a changing pattern of the period of the signal fluctuation sensed in the operation of sensing the fluctuation.

With the above method, the period of the signal fluctuation allows the period of the object's jiggling to be sensed indirectly. For example, when the object is a raindrop, since a larger raindrop jiggles for a longer period according to its physical property, the size of the raindrop can be estimated by the sensed period of jiggling.

Next, a sensing method of the present invention further can include the operation of sensing a degree of the fluctuation of the signals from the photo-detector in the operation of sensing the fluctuation of the signals. The changing pattern of the signal fluctuation used in the operation of judging the object can be a changing pattern of the degree of the signal fluctuation sensed in the operation of sensing the fluctuation.

With the above method, the degree of the signal fluctuation allows the degree of the object's jiggling to be sensed indirectly. For example, when the object is a raindrop, since a larger raindrop jiggles a larger degree according to its physical property, the size of the raindrop can be estimated by the sensed degree of jiggling.

The sensing method of the present invention can be the following method.

Furthermore, the above sensing method can be carried out as follows.

The above sensing method further can include the operations of, as the operation of sensing the period of the signal fluctuation, compressing signals in a sequence of the sampled signals when they continue within a single segment, where a plurality of the segments defined by a plurality of predetermined values are set with respect to an input signal, and calculating a compressibility from the number of the sampled signals to be compressed and the number of the sampled signals that have been compressed, and, in the operation of judging the object, using the compressibility as a representation of the changing pattern of the period of the signal fluctuation so as to judge the object on the sensing surface.

With the above method, the period of the signal fluctuation can be sensed. Also, it is possible to reduce effectively a data amount of a signal portion without a substantial change in the sequence of the sampled signals. Furthermore, since the data of a signal portion necessary for a sensing operation are not compressed, the sensing accuracy will not be deteriorated.

Furthermore, the above sensing method also can be carried out as follows.

The above sensing method further can include the operations of, as the operation of sensing the degree of the signal fluctuation, calculating the number of times that signals in a sequence of the sampled signals change from one segment to another within a predetermined period, where a plurality of the segments defined by a plurality of predetermined values are set with respect to an input signal, a direction of increase or decrease of the change and a change amount thereof, and, in the operation of judging the object, using the number of times, the direction and the change amount as a representation of the changing pattern of the degree of the signal fluctuation so as to judge the object on the sensing surface.

With the above method, the degree of the signal fluctuation can be sensed. Also, it is possible to focus only on a portion with a substantial signal change, which indicates a change in the condition of the sensing surface, in the sequence of the sampled signals, and analyze this change, thereby detecting the change in condition of the sensing surface.

Moreover, the above-mentioned sensing methods can be combined.

The sensing method further can include the operations of, in the operation of sensing the fluctuation of the signals, compressing signals in a sequence of the sampled signals when they continue within a single segment, where a plurality of the segments defined by a plurality of predetermined values are set with respect to an input signal, calculating a compressibility from the number of the sampled signals to be compressed and the number of the sampled signals that have been compressed, and sensing a period of the signal fluctuation from a time the signal fluctuation is sensed to a time that an attenuation of a degree of the signal fluctuation to a predetermined degree is sensed based on the compressibility, and, in the operation of sensing the fluctuation of the signals, calculating the number of times that signals in the sequence of the sampled signals change from one segment to another within a predetermined period, calculating a direction of increase or decrease of the change and a change amount thereof, and sensing a degree of the signal fluctuation based on the direction of increase or decrease of the change and the change amount. The changing pattern of the signal fluctuation used in the operation of judging the object can be a changing pattern of the period of the signal fluctuation sensed in the operation of sensing the fluctuation. The changing pattern of the signal fluctuation used in the operation of judging the object can be a changing pattern of the degree of the signal fluctuation sensed in the operation of sensing the fluctuation.

With the above method, the period and degree of the signal fluctuation can be sensed. Also, it is possible to reduce effectively a data amount of a signal portion without a substantial change in the sequence of the sampled signals, while since the data of a signal portion necessary for a sensing operation are not compressed, a sensing accuracy will not be deteriorated Moreover, it is possible to focus only a portion with a substantial signal change, which indicates a change in the condition of the sensing surface, in the sequence of the sampled signals, and analyze this change, thereby detecting the change in condition of the sensing surface.

If any of the sensing methods described above further includes an operation of removing a noise from the signals from the photo-detector, it is possible to eliminate the influence of the noise, allowing a highly accurate sensing operation.

If a spike noise is removed in advance from the signals that are inputted in the operation of removing the noise, a noise-removing accuracy improves.

One example of the operation of removing the noise includes averaging a predetermined number of samples of sequentially inputted signals.

In any of the first to third sensing methods described above, a liquid drop can be sensed. The liquid drop includes, for example, any of a raindrop, a water droplet or a drizzle drop.

Next, a wiper controlling method of the present invention is characterized by using the above-described sensing method of the present invention and controlling a wiper based on a judgement made by this sensing method.

The inventors have made the present invention by analyzing in detail the movement of water droplets after dropping on the sensing surface.

First, a basic optical system that can be used in the present invention will be described referring to FIG. 1.

As shown in FIG. 1, light emitted from a photo emission element 3 such as LED passes through a prism glass 5 and is led to a glass substrate 2, which is a transparent substrate as an object for detecting water droplets. This light is total-reflected by a sensing surface SS, passes through the prism glass 5, and then enters a photo-detector 4 such as a photodiode.

The sensing device of this figure is installed such that the photo-detector generates the maximum output when no water droplet is present. When there is a water droplet 6 existing on the sensing surface, the output level of the photo-detector decreases.

FIG. 2 shows a configuration of the entire sensing device, which is divided into a foregoing part 1a and a subsequent part 1b for convenience.

It is appropriate that the photo emission element should be driven with a pulse waveform at a frequency (carrier frequency) of at least 500 Hz. Since the light-emitting characteristics of the photo emission element 3 vary depending on temperature, it is preferable that an actual emitted light quantity is monitored using a monitoring photo-detector 8 and a monitoring detecting circuit 9. It is further preferable that a driving circuit 7 drives the photo emission element 3 while receiving a feedback signal of the result of the monitoring (see FIG. 2).

As shown in FIG. 2, the light enters the photo-detector 4, so that an output signal is generated. Since this signal includes a carrier waveform at the time of driving the photo emission element, the signal first is supplied to a signal detection circuit 10, thus extracting only an actual signal.

In many cases, since a generally available photo-detector cannot produce a signal with a sufficiently high level output, it is preferable that the signal from the photo-detector is amplified by an amplifier circuit 11.

Subsequently, the signal is inputted to an A/D converter 12 so as to be converted into a digital signal. The dynamic range of the A/D converter suitably is set according to an output level of the above-described optical system.

An output signal of the A/D converter 12 is inputted to a fluctuation sensing part 13, which senses the fluctuation of the inputted signal.

For example, when the fluctuation sensing part 13 includes a part for sensing the degree of the signal fluctuation, it is possible to sense the degree of the fluctuation of the inputted signal. On the other hand, when the fluctuation sensing part 13 includes a part for sensing a period from a time the signal fluctuation is sensed to a time an attenuation of a degree of the signal fluctuation to a predetermined degree is sensed, it is possible to sense the period of the fluctuation of the inputted signal.

Then, an output signal from the fluctuation sensing part 13 is inputted to a judging part 14, which judges an object that has impacted on the surface based on a changing pattern of the signal fluctuation sensed by the fluctuation sensing part 13. For example, in this case, the changing pattern of the degree or period of the fluctuation of the signal from the fluctuation sensing part 13 is analyzed, so that the object is judged.

It is possible to configure the fluctuation sensing part 13 and the judging part 14 described above with a software (SW).

With respect to the signal from the optical system described above, the sensing of the signal fluctuation, sensing of its changing pattern and the judging operation of the object were analyzed in detail in the following manner.

First, the cases of a large raindrop and a small raindrop were analyzed. When the large raindrop impacted on the sensing surface, the signal pattern varied considerably and it took longer to stabilize as shown in FIG. 3A. On the other hand, in the case of the small raindrop (see FIG. 3B), the signal pattern did not vary very much and it took only a short time to stabilize.

After impacting on the sensing surface, the large raindrop jiggles a relatively large amount in the beginning and then the jiggling declines gradually and takes a relatively long time to stabilize, while the small raindrop jiggles a relatively small amount and stabilizes in a relatively short time. These physical phenomena can be understood according to the natural law. For example, a force for suppressing the raindrop jiggling includes surface tension, internal friction and boundary friction against the sensing surface and so on. In the case of raindrops, the surface tension should have a particularly large influence. The surface tension is considered to be inversely proportional to a surface area. On the other hand, a force for maintaining the raindrop jiggling includes inertial force and external pressure. The inertial force is a force that is proportional to the mass, and thus, the volume of the raindrop, and the external pressure such as wind is a force that is proportional to the surface area. Consequently, compared with the large raindrop, the small raindrop is subjected to a larger influence of the surface tension for suppressing the jiggling, and a smaller inertial force and external pressure for maintaining the jiggling. Therefore, the jiggling of the small raindrop stabilizes more quickly than that of the large raindrop.

The inventors of the present invention focused on this point and conceived that information on the conditions of the sensing surface could be obtained by recognizing and identifying the signal patterns.

Such pattern recognition generally requires a large amount of hardware resources. Accordingly, the inventors have made it possible to recognize the signal patterns even with a small amount of the hardware resources.

In the following, an exemplary content of the operations of the fluctuation sensing part 13 and the judging part 14 will be described. The description is directed to the cases of a large raindrop and a small raindrop as an example.

First, the operation of sensing the changing pattern of the period of the signal fluctuation and judging the object will be described.

This can be achieved by a method described below and means of enabling it. In the following, the cases of the large raindrop and the small raindrop will be described as an example.

First, a plurality of segments defined by a plurality of predetermined values are set with respect to an input signal When signals in a sequence of sampling signals continue within a single segment, those signals are compressed and thus recorded.

At this time, it is appropriate that a predetermined period for one event caused by an object to be sensed (when the object to be sensed is a raindrop, the change on the sensing surface from beginning to end caused by one raindrop) should be set in advance. For example, compressibility is calculated from the number of the sampling signals to be compressed ($N_0$) and that of the compressed sampling signals (N). Then, the feature of the raindrop signal can be estimated by this compressibility. Here, the compressibility is defined as ($N_0$-N)/$N_0$. Then, it can be estimated, for example, that the raindrop is small when the compressibility is relatively large, while the raindrop is large when the compressibility is relatively small. The large raindrop jiggles considerably after impacting on the sensing surface, and its signal also fluctuates considerably as shown in FIG. 3A. Thus, the sequence of signals cannot be compressed very much. On the other hand, the small raindrop does not jiggle considerably after impacting on the sensing surface, and its signal fluctuates only slightly and stabilizes quickly within a certain range as shown in FIG. 3B. Accordingly, the sequence of signals can be compressed efficiently.

Incidentally, the above-mentioned predetermined period may be set so as to be a time required for the stabilization of the jiggling of the object to be sensed.

The above-described compression of the signals has an advantage that the data amount to be stored is compressed, thus reducing a necessary amount of memory resources.

The compressibility is treated not as a calculated value but as a predetermined value. Therefore, by assigning a label code thereto so as to treat it with this label code, the data amount is compressed further, making it possible to save the memory resources.

The above description is directed to the operation of judging the object based on the changing pattern of the period of the signal fluctuation utilizing the compressibility.

Next, the operation of sensing the changing pattern of the degree of the signal fluctuation and judging the object will be described.

That is, as shown in FIG. 3A, in the case of the large raindrop, the signal pattern varies considerably. The variation often shifts to another segment. In addition, the signal level fluctuates greatly as a whole.

On the other hand, in the case of the small raindrop (see FIG. 3B), the signal pattern does not vary considerably. The variation does not shift to another segment very often (especially, the movement to a segment having a smaller value is rare). As a whole, the signal level does not fluctuate greatly.

In the sequence of the sampling signals, the number of times, if any, that the signals change from one segment to another within a predetermined period and the direction of the increase or decrease are stored in memory. A feature value of the raindrop signal can be defined by the number of changes within the predetermined period for one event and the directions of the increase and decrease.

For example, the raindrop can be estimated as a large raindrop when the number of the changes from one segment to another is large, many interspersed increases and decreases are present, and the signal level fluctuation generally is large. On the other hand, the raindrop can be estimated as a small raindrop when the number of the changes from one segment to another is small, that of the increases and decreases is small, and the signal level fluctuation generally is small.

The above description is directed to the operation of judging the object based on the changing pattern of the degree of the signal fluctuation.

Furthermore, the degree of the signal decrease at the moment of impact of the raindrop also can be used for estimating the size of the raindrop.

As becomes clear from FIGS. 3A and 3B, it is estimated that the raindrop is large when the degree of the decrease is large, while the raindrop is small when the degree of the decrease is small.

In this case, the degree of the decrease is evaluated not with the value itself but with segments obtained by dividing the input signal, thereby reducing a necessary amount of memory. It is appropriate to assign a label code to each segment.

BRIEF DESCRIPTION OF DRAWINGS

FIG. 1 illustrates an example of an optical system that can be used for the present invention.

FIGS. 3A and 3B illustrate examples of signal patterns of different sizes of raindrops.

FIGS. 6A and 6B illustrate a model of signal processing in the present invention.

BEST MODE FOR CARRYING OUT THE INVENTION

In the following, an evaluation of a changing pattern of a signal fluctuation, which is a characteristic of the present invention, will be described in detail.

(Providing Segments)

Figure 4A:
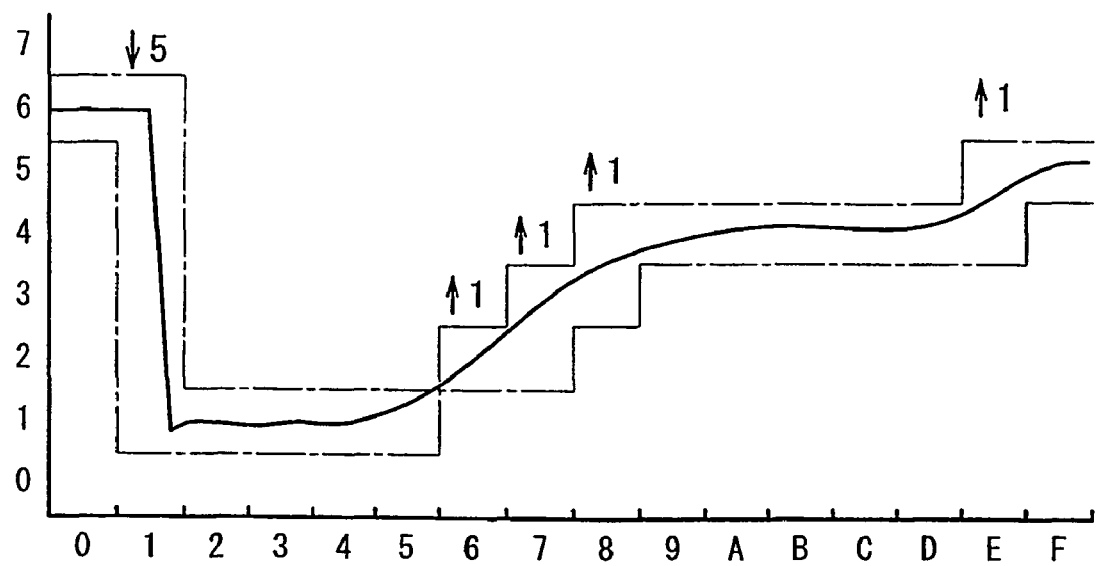
FIGS. 4A and 4B illustrate a model of signal processing in the present invention.

FIG. 4A shows a typical example of a signal pattern when a raindrop impacts on a sensing surface. Prior to a pattern recognition operation, segments are provided with respect to a signal value. It is appropriate that a label code is assigned to each segment. Then, in a matrix of the signal value axis and the time axis, blocks (tiles) formed by these segments are considered. The pattern recognition operation is performed using the blocks through which the input signal pattern passes.

(Changing Pattern of Period of Signal Fluctuation)

For evaluating the period of the signal fluctuation, the data compression, the compressibility calculation, the evaluation of the changing pattern of the signal fluctuation based on the compressibility and the judging of the object will be described more specifically.

Figure 4B:
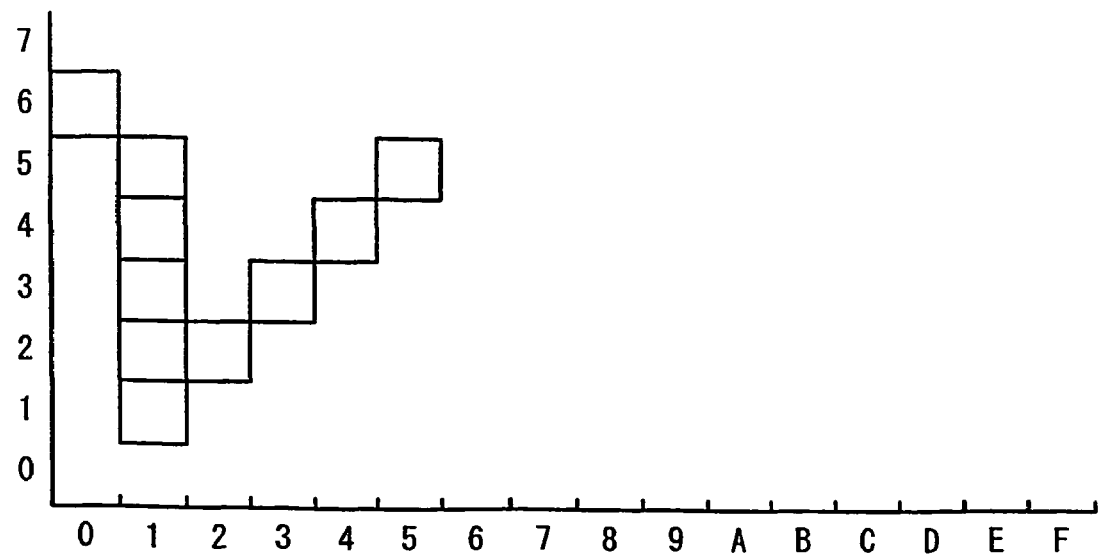

When a plurality of the segments through which the input signal pattern passes continue in the same segment in the time axis direction, following segments are stacked one by one onto a foregoing segment. This may be understood such that tiles continuing in the same segment are stacked onto their foregoing tile. In this manner, when signals in a sequence of the signals continue within a single segment, those signals are compressed. FIG. 4B shows a model of this compression. In this figure, for example, 16 segments of sampling signals are compressed to 6 segments of sampling signals.

Next, the method for calculating the compressibility will be described.

In the signal pattern shown in FIG. 4A, 16 segments of sampling signals are compressed to 6 segments of sampling signals as described above.

The phenomenon when the raindrop impacts on the surface is now discussed. At the moment the raindrop impacts on the surface, a sudden decrease in the signal is observed.

Accordingly, the sudden signal decrease may be regarded as a start of the event, and then the compression within a predetermined period may be considered. For example, in FIG. 4, when the predetermined period is set to be 15 segment periods from 1 to F, sampling signals are compressed to 5 segments of sampling signals. That is to say, the compressibility is (15−5)/15=0.67.

Figure 5A:
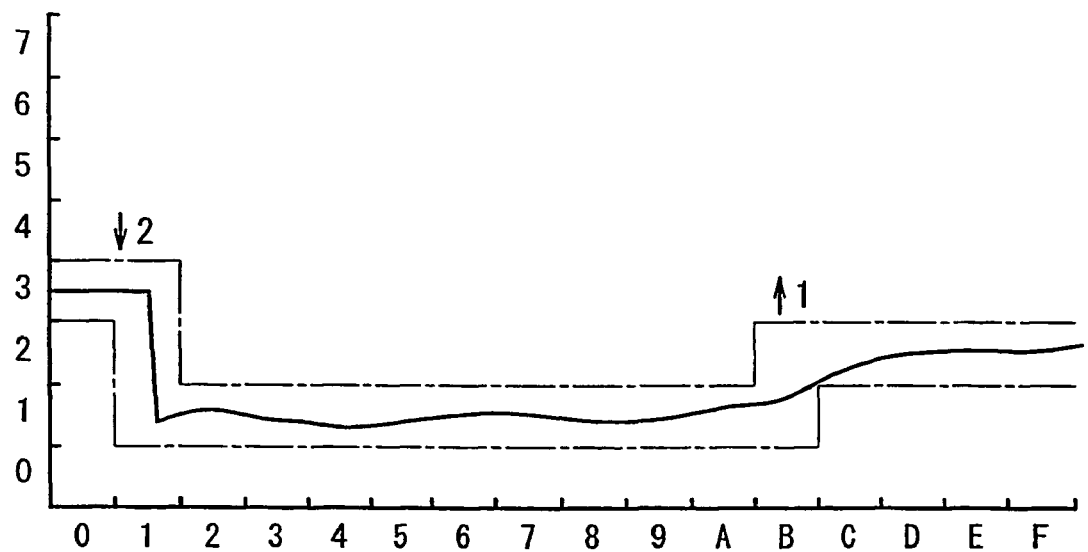
FIGS. 5A and 5B illustrate a model of signal processing in the present invention.
Figure 5B:
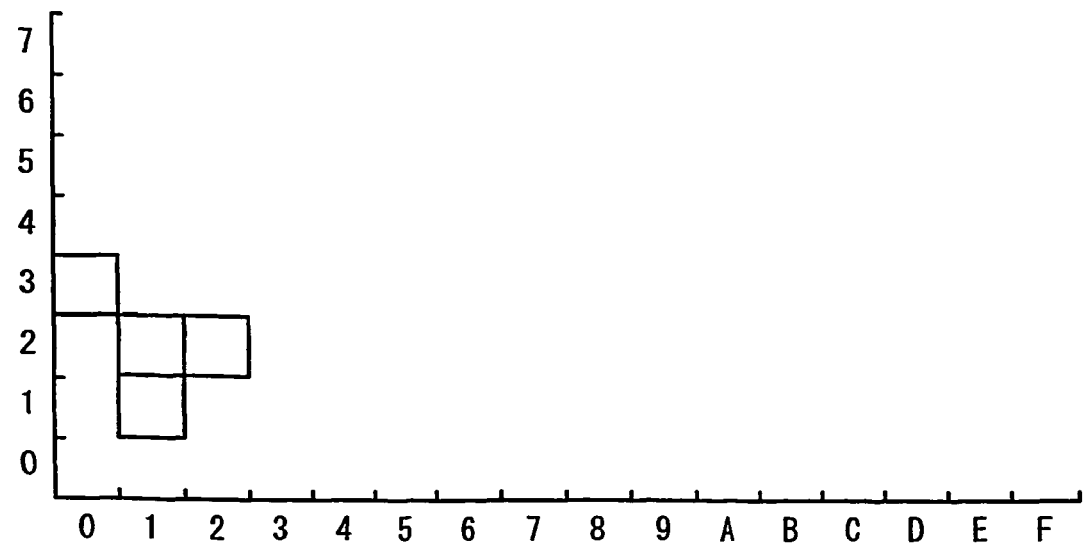

FIGS. 5A and 5B respectively show examples of a signal pattern of a small raindrop and segments provided for this signal. FIGS. 6A and 6B respectively show examples of a signal pattern of a large raindrop and segments provided for this signal.

In the example of FIG. 5, 15 segments of sampling signals are compressed to 2 segments of sampling signals. That is to say, the compressibility is (15−2)/15 =0.87. Similarly, in the example of FIG. 6, 15 segments of sampling signals are compressed to 6 segments of sampling signals. That is to say, the compressibility is (15−6)/15=0.6.

Next, according to the compressibilities obtained as above, the features of the detected raindrop signals are as follows.

As becomes clear from the comparison of FIGS. 5 and 6, when the large raindrop impacts on the sensing surface, it takes longer for the movement to stabilize, so that the compressibility of the signals is relatively small. On the other hand, in the case of the small raindrop, it takes shorter for the movement to stabilize, so that the compressibility of the signals is relatively large.

For example, using Table 1, each raindrop signal may be associated with the feature of the raindrop.

TABLE 1

Correspondence between compressibility and raindrop size

| Compressibility | Raindrop |
|---|---|
| Large | Small |
| Small | Large |

Based on Table 1, the size of each raindrop can be estimated from the compressibility. In order to obtain a more specific raindrop size, a conversion factor may be calculated experimentally in a specific system of measurement.

(Changing Pattern of Degree of Signal Fluctuation After Impact)

Next, for evaluating the changing pattern of the degree of the signal fluctuation, the sensing of the number of signal changes across segments, the calculation of the direction of increase or decrease of the change and the change amount, the evaluation of the changing pattern of the signal fluctuation based on the direction and the change amount and the judging of the object will be described more specifically.

As shown in FIG. 4A, the input signal increases in each of the 6th, 7th, 8th and Eth segment of sampling signals on the time axis by one segment each from the foregoing sampling signal. In other words, the number of the changes in signal value across the segment is four, and the change amount is a four-segment increase. The increase/decrease directions of the change are only four "increasing directions."

Similarly, in FIG. 5, the number of the changes in signal value across the segment is one, and the change amount is a one-segment increase. The increase/decrease direction of the change is only one "increasing direction."

Also, in FIG. 6, the number of the changes in signal value across the segment is five, and the change amount is a four-segment increase and a one-segment decrease. The increase/decrease directions of the change are four "increasing directions" and one "decreasing direction."

The large number of the changes in signal value across the segment leads to an estimation that the raindrop is large, while the small number leads to an estimation that the raindrop is small. With respect to the change amount, a large increase leads to estimation that the raindrop is large, while a small increase leads to estimation that the raindrop is small. In addition, with respect to the increase/decrease directions of the change, the presence of decrease leads to an estimation that the raindrop is large, while the absence of decrease leads to an estimation that the raindrop is not large.

With the above basic features in mind, based on Table 2, the size of each raindrop can be estimated from the change amount of the signal pattern after the impact on the surface. In order to estimate a more specific raindrop size, a conversion factor may be calculated experimentally in a specific system of measurement.

TABLE 2

Correspondence between change amount and raindrop size

| Number of changes | Raindrop |
|---|---|
| Small | Small |
| Large | Large |
| Change amount of increase | Raindrop |
| Small | Small |
| Large | Large |
| Increase/decrease directions of change | Raindrop |
| Increase alone | Not large |
| Presence of decrease | Large |

(Change Amount of Signal at the Time of Adhering)

Furthermore, the evaluation of the change amount of the signal pattern when the raindrop impacts on the surface will be described.

In FIG. 5, the input signal decreases by two segments from the first segment of sampling signal to the second segment of sampling signal. Similarly, in FIG. 6, the input signal decreases by five segments from the first segment of sampling signal to the second segment of sampling signal.

With respect to the input signal when the raindrop impacts on the surface, the change amount (decreasing amount) of segments and the size of a raindrop can be estimated based on a correspondence table of Table 3. In order to estimate a more specific raindrop size, a conversion factor may be calculated experimentally in a specific system of measurement.

TABLE 3

Correspondence between change amount and raindrop size

| Change amount | Raindrop |
|---|---|
| Small | Small |
| Large | Large |

In the configuration of calculating the number of signal changes at the time of and after the impact, the number of segments of sampling signals compressed in the data compression does not have to be calculated as above. In other words, in such a configuration, the signal decrease at the time of impact is included in the number of changes. Thus, the number of changes at the time of impact combined with that after the impact corresponds to the number of compressed segments of sampling signals. Table 4 shows the number of changes and that of the compressed segments of sampling signals in FIGS. 4 to 6. The above-described compressibility can be calculated by using the values of these numbers of changes.

TABLE 4

| Example | Number of changes | Number of compressed segments of sampling signals |
|---|---|---|
| FIG. 4 | 5 | 5 |
| FIG. 5 | 2 | 2 |
| FIG. 6 | 6 | 6 |

EXAMPLE

Figure 2:
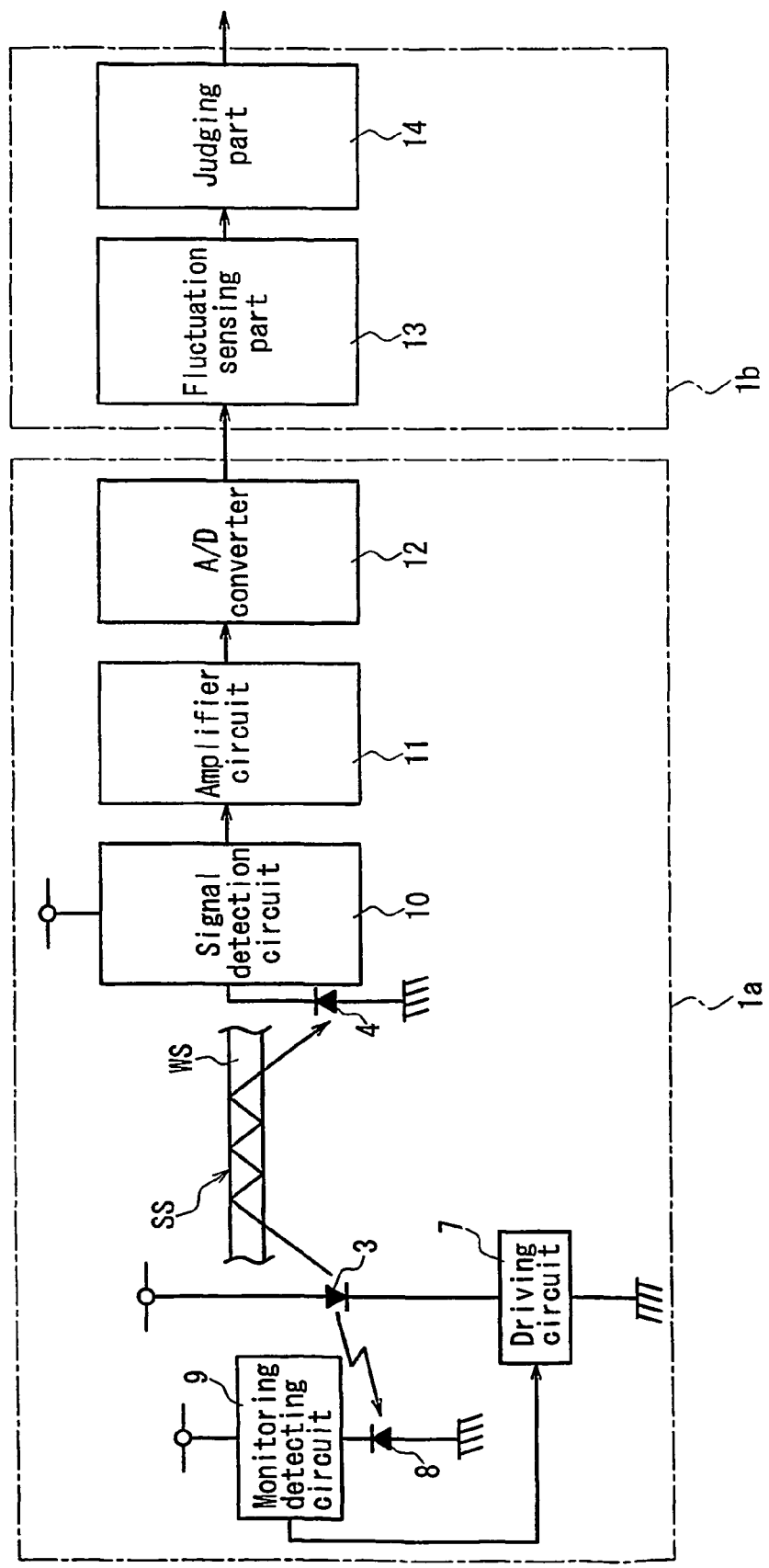
FIG. 2 illustrates hardware in a configuration of a sensing device according to the present invention.

Example of Combining Chanting Patterns of Period and Degree of Signal Fluctuation The following is a description of a sensing device using both the evaluation based on the period of the signal fluctuation utilizing the compressibility described above and the evaluation based on the degree of the signal fluctuation utilizing the direction of signal change and the change amount described above. In this sensing device, a signal from the hardware shown in FIG. 2 is controlled by a software for realizing operations shown in FIG. 7, thereby performing a sensing operation FIGS. 8 to 10 respectively show illustrative examples of signal patterns when small, medium and large raindrops adhere to a sensing surface of the sensing device mounted on a windshield. The vertical axis indicates an output voltage, and one dot corresponds to 4.88 mV. The horizontal axis indicates a time axis, and one dot corresponds to 0.5 msec.

The small raindrop is an example of a raindrop with a diameter of about 7 mm at the time of impact, the medium raindrop is an example of a raindrop with a diameter of about 9 mm at the time of impact, and the large raindrop is an example of a raindrop with a diameter of about 11 mm at the time of impact.

Figure 8:
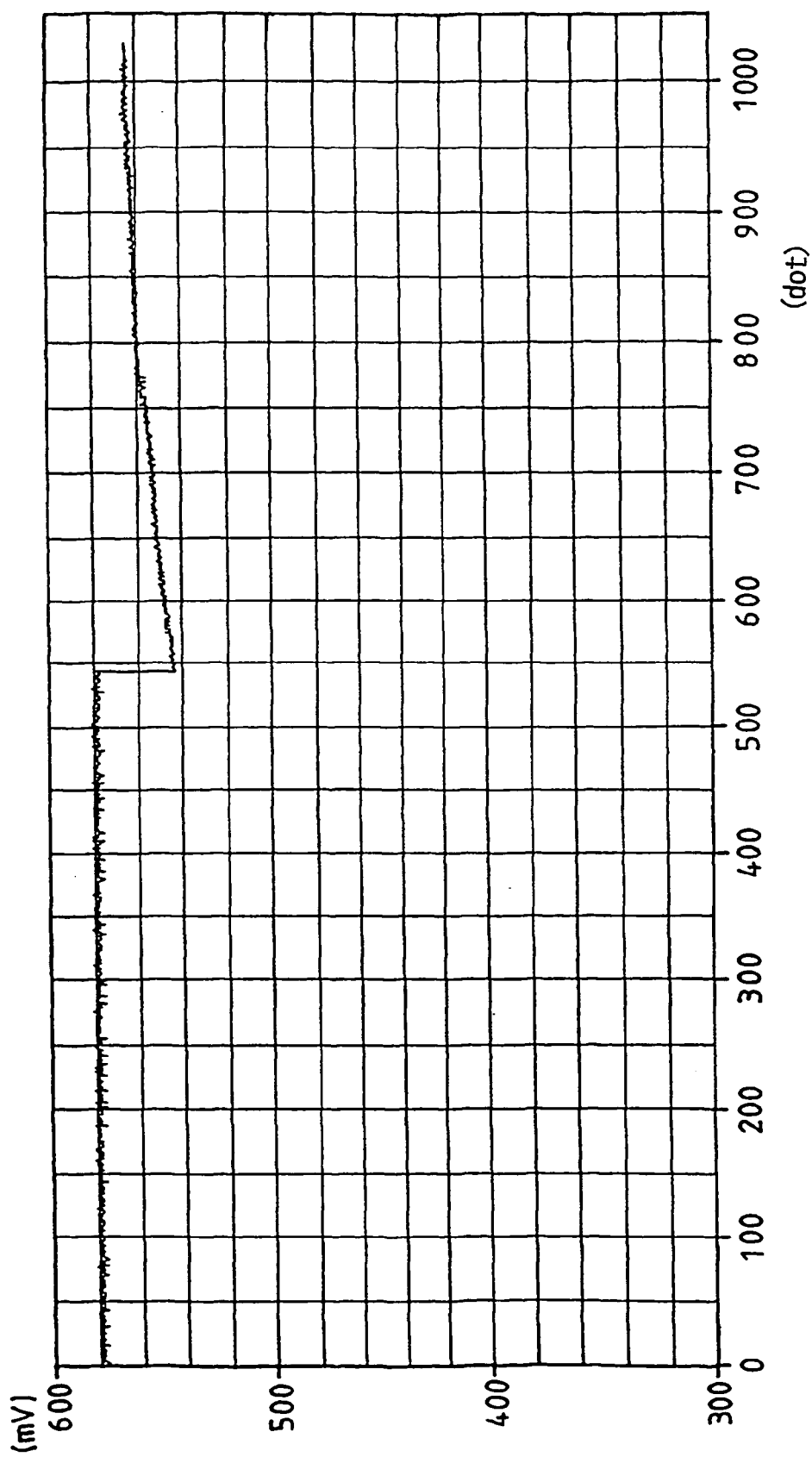
FIG. 8 illustrates a signal pattern of a small raindrop.
Figure 9:
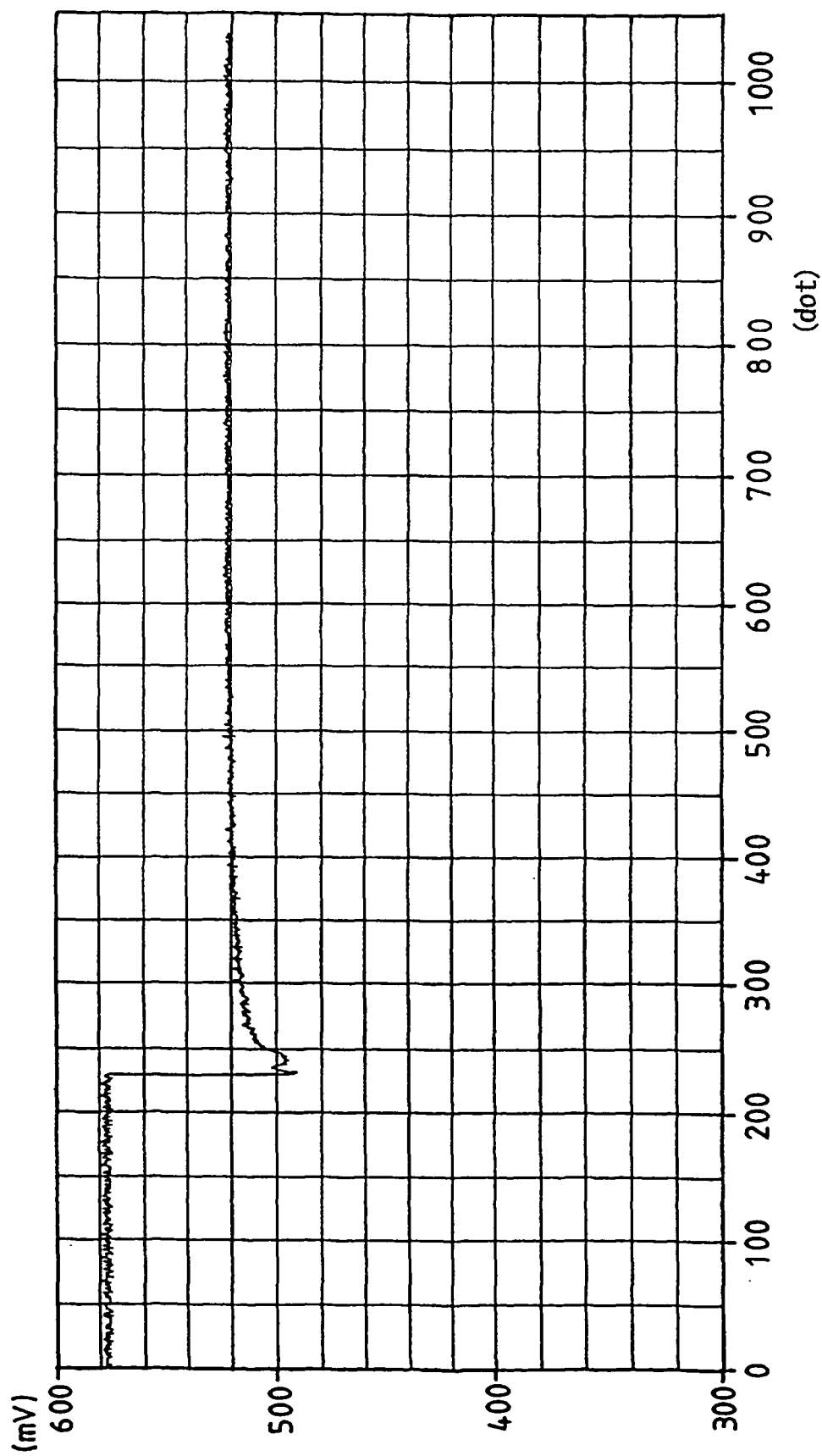
FIG. 9 illustrates a signal pattern of a medium raindrop.
Figure 10:
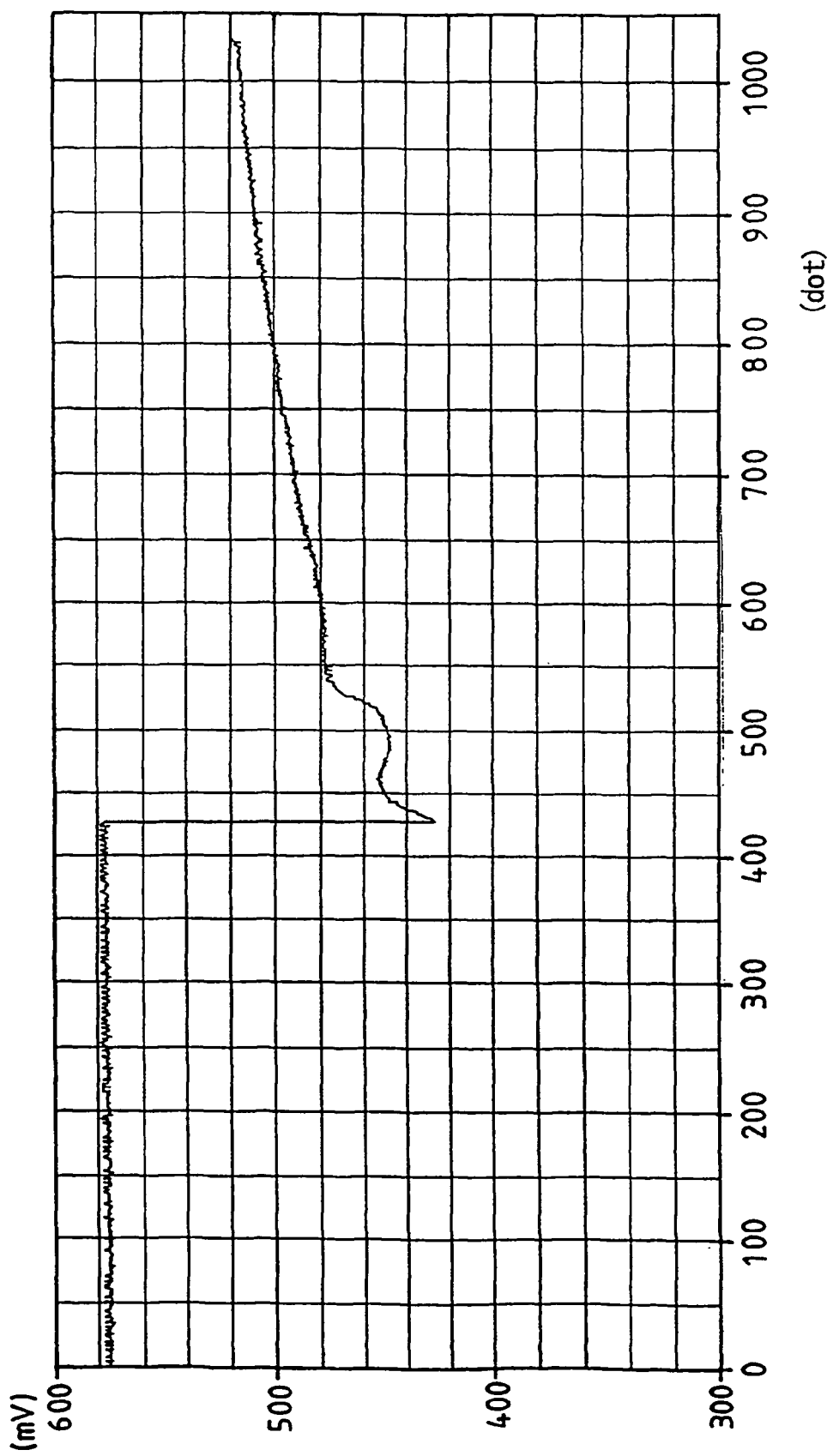
FIG. 10 illustrates a signal pattern of a large raindrop.

In the examples shown in FIGS. 8 to 10, the horizontal axis as the time axis is divided into segments in the unit of 50 dots (25 msec) for convenience. The vertical axis as the output voltage is divided into segments in the unit of 20 dots (97.6 mV). The respective feature values were calculated from these signal patterns, which are shown in Table 5.

TABLE 5

| Raindrop | Compressibility | Number of changes | Change amount of increase | Increase/decrease directions | Change amount |
|---|---|---|---|---|---|
| Small | 9/11 | 2 | 1 | Increase alone | 1 |
| Medium | 8/11 | 3 | 2 | Increase alone | 4 |
| Large | 6/11 | 5 | 4 | Increase alone | 7 |

As becomes clear from Table 5, there are certain relationships between the raindrop size and the compressibility, and further between the raindrop size and the feature value that are defined by the number of changes, the change amount of increase, the increase/decrease directions and the change amount.

Based on these relationships, the size of a raindrop can be estimated from the calculated compressibility and the feature value.

Figure 7:
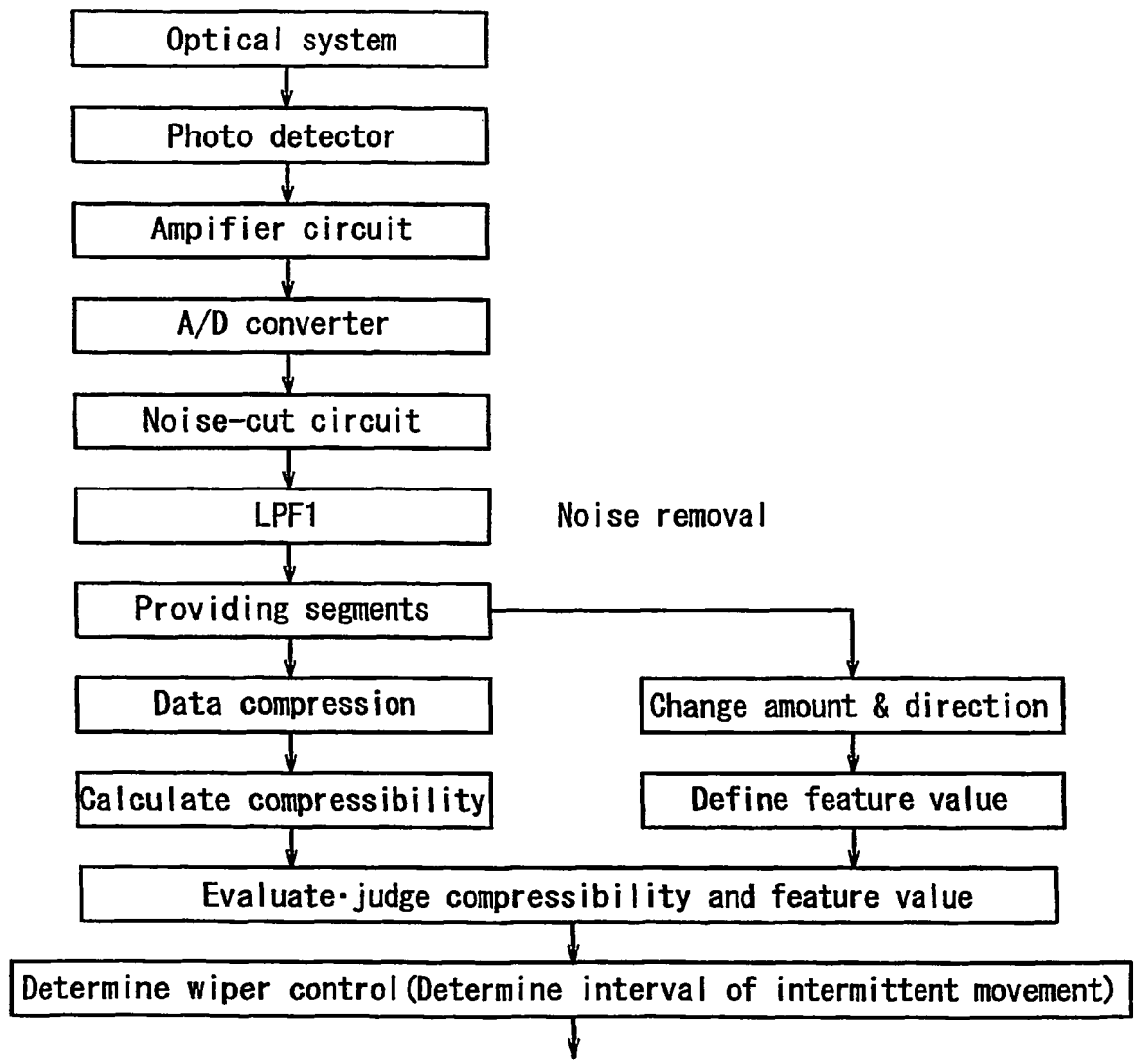
FIG. 7 illustrates an operation sequence of signal processing in the present invention.

As in the operations shown in FIG. 7, the compressibility and the feature value are evaluated and judged, and the result is used as one of the sources of judgement so as to determine a wiper control (for example, intervals of intermittent movement).

Figure 11:
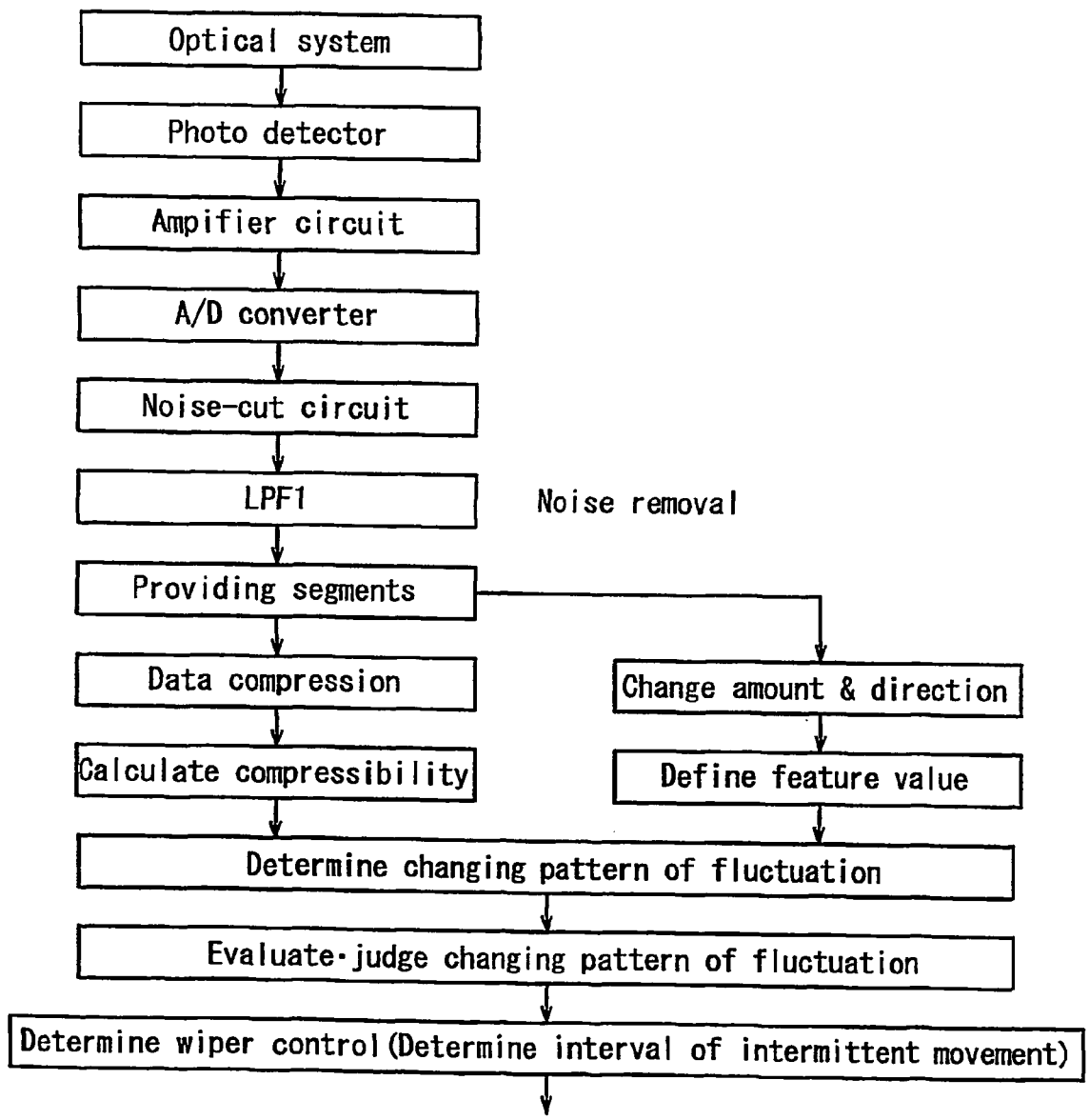
FIG. 11 illustrates an operation sequence of signal processing in the present invention.

Furthermore, the compressibility and the feature value can be evaluated with a concept of "jiggling" of the raindrop. Table 6 shows the relationship between these variables. The size of the raindrop may be estimated from the degree of jiggling and the period of jiggling and used for controlling the wiper. FIG. 11 shows an example of such an operation.

TABLE 6

Correspondence between compressibility and feature value

| Jiggling degree | Jiggling period | Compressibility | Raindrop |
|---|---|---|---|
| Small | Short | Large | Small |
| Large | Long | Small | Large |

As shown in FIG. 11, the degree of raindrop jiggling and the period of raindrop jiggling are determined from the compressibility and the feature value so as to be evaluated and judged. The result is used as one of the sources of judgement so as to determine a wiper control (for example, intervals of intermittent movement).

For example, a large degree of jiggling or a long period of jiggling generally means a large raindrop and a heavy rain. In this case, it is appropriate that the intervals of intermittent movement should be shortened or that the driving speed of the wiper should be raised, for example.

On the other hand, a small degree of jiggling or a short period of jiggling generally means a small raindrop and a light rain. In this case, it is appropriate that the intervals of intermittent movement should be extended or that the driving speed of the wiper should be slowed down, for example.

In the above description, the impact of a raindrop has been regarded as a starting point of one event with respect to the signal compression, for facilitating understanding.

However, in an actual sensing device and a wiper controlling apparatus, a wiping request signal has to be outputted at a suitable time interval. Therefore, the data compression appropriately is considered at a certain time interval rather than regarding the impact of a raindrop as the starting point. More specifically, the data compression appropriately is processed in the unit of 50 to 100 msec.

Figure 12:
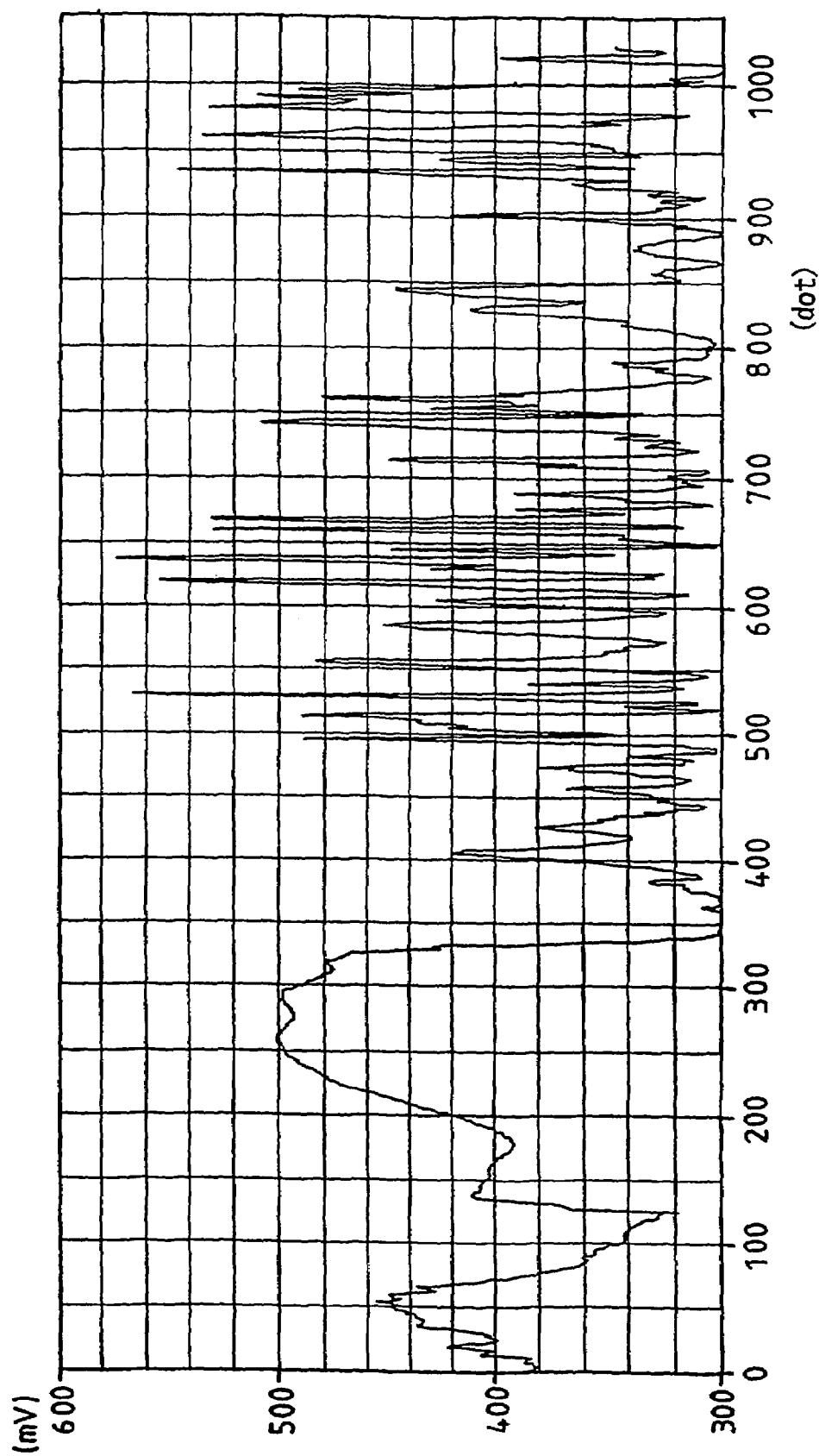
FIG. 12 illustrates a signal pattern of splashing water.
Figure 13:
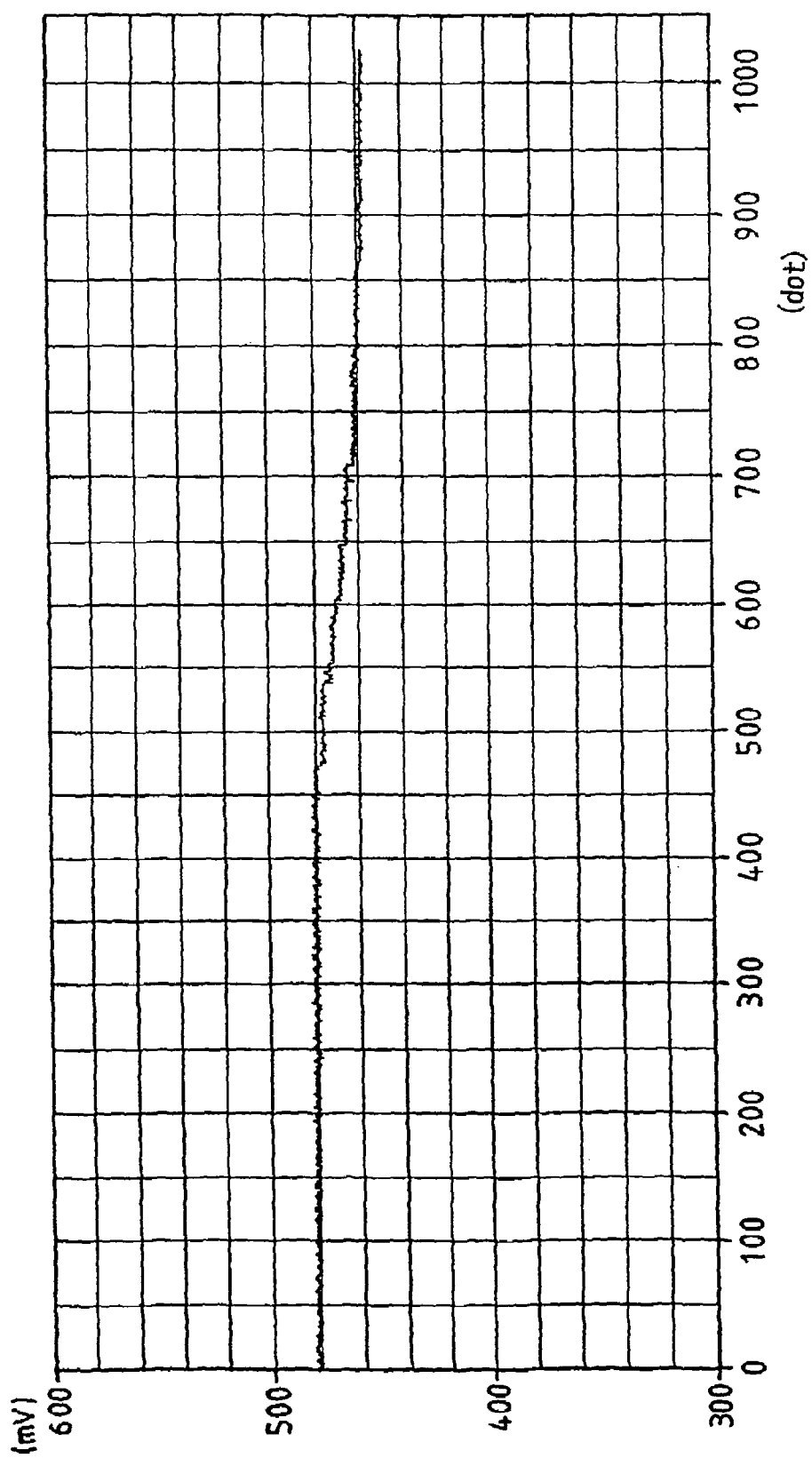
FIG. 13 illustrates a signal pattern of a drizzle drop.

FIGS. 12 and 13 show examples of signal patterns when splashing water and a drizzle drop adhere to the surface, respectively. The splashing water indicates the case in which, for example, a windshield is splashed with water by an oncoming vehicle. In this case, an entire sensing surface becomes wet. The drizzle drop is an example of a raindrop diameter of about 0.5 mm or smaller. In these examples, as in FIGS. 8 to 10, the time axis and the output voltage were divided into segments in the units of 50 dots and 20 dots, respectively.

In the example of the splashing water, the signal fluctuates within one segment. Thus, the signal pattern cannot be evaluated and analyzed accurately. In the example of the drizzle drop, the change amount in the output axis is small. Therefore, when the output axis is divided into segments as above, the impact of the drizzle drop cannot be recognized properly.

The above situations show that there is a suitable unit for segments in the signal pattern processing. Also, with respect to segments along the time axis, it also is necessary to consider that the sensing device has to output the wiping request signal at a suitable time interval.

In the above description, the segments were provided in the above-described units for facilitate the easiness of drawing. However, since the operation is carried out by software in practice, it is possible to provide much smaller segments. For example, the segment along the time axis can be narrowed to the unit of one dot (0.5 msec), and the output voltage can be provided with segments in the unit of four dots (19.52 mV).

When the segment along the time axis is narrowed to the unit of one dot and the output voltage is provided with segments in the unit of four dots as described above, the signal patterns can be evaluated and analyzed in a sufficiently accurate manner even in the cases of splashing water and drizzle drop.

This sensing device allows a raindrop or the like to be sensed and estimated according to the present invention by using a small amount of hardware resources, for example, a CPU manufactured by Hitachi, Ltd. (H8S/2134, clock speed of 20 MHz) and a memory of 4 kB.

In the above description, the time segment (for example, one dot corresponds to 0.5 msec) and the signal value segment (for example, four dots correspond to 19.52 mV) have been used as processing units along the time axis and the signal axis, respectively. However, in view of its technical concept, the present invention is not necessarily limited to an embodiment using these segment units. For example, it may be possible to use a period that is an arbitrary integral multiple of one sampling period as a processing unit along the time axis and to use a value that is an arbitrary integral multiple of one quantization unit as a processing unit along the signal value axis.

(Application Example: Wiper Controlling Apparatus)

Figure 14:
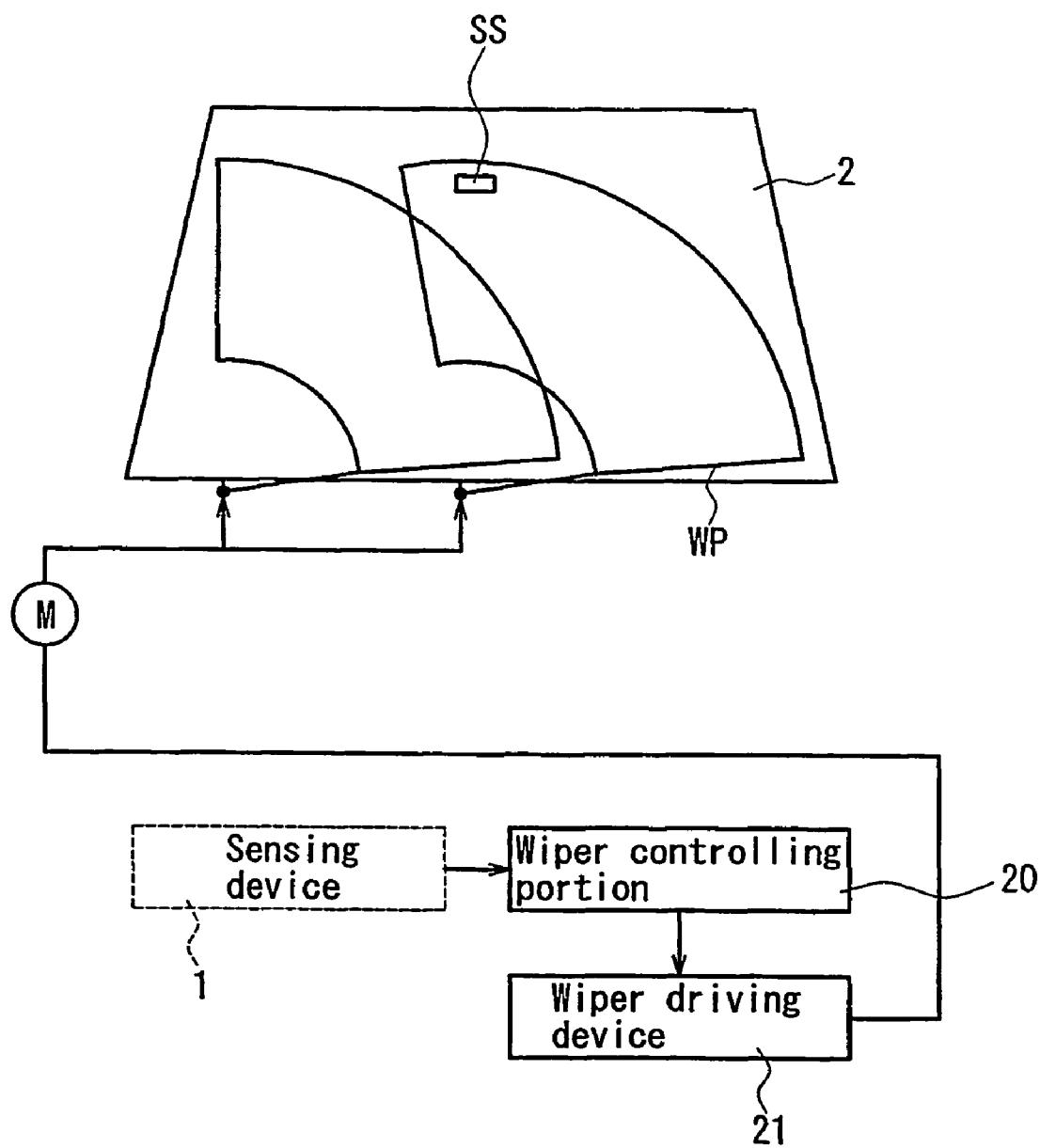
FIG. 14 is a conceptual view for describing a wiper controlling apparatus according the present invention.

A wiper controlling apparatus using the above-described sensing device will be described with reference to FIG. 14.

In the wiper controlling apparatus, a sensing device 1 first senses a raindrop. Then, the sensing device 1 determines the compressibility, the feature value and further the changing pattern of the fluctuation, which are characteristics of the present invention, so as to evaluate and judge them.

The sensing device 1 sends a signal to a wiper controlling portion 20 in a CPU for an integrated control of a car. Finally, based on the judgement of this wiper controlling portion 20, it is determined that a wiper is operated, so that a wiper driving device 21 drives the wiper.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

As described above, in a sensing device of the present invention in which light emitted from a light-emitting member is reflected by a sensing surface and then received by a photo-detector, thereby detecting a condition of the sensing surface, a changing pattern of a signal fluctuation is sensed and then analyzed, thereby sensing the object that has impacted on the sensing surface. As the changing pattern of the signal fluctuation, the degree of the signal fluctuation and the period of the signal fluctuation can be used.

In the case of evaluating the period of the signal fluctuation, when signals in a sequence of the sampling signals from the photo-detector continue within a single segment, those signals are compressed, and further a compressibility thereof is calculated. Since this compressibility reflects a movement of the raindrop, the condition of the raindrop can be estimated more accurately.

In the case of evaluating the degree of the signal fluctuation, the number of changes, the increase/decrease directions of the changes and their change amount are calculated with respect to the sampling signals. Since these parameters reflect a movement of the adhering raindrop, the condition of the raindrop can be estimated more accurately.

Also, in the present invention, the feature value of the raindrop size is defined by the number of changes, the increase/decrease directions of the changes and their change amount in an integrated manner with respect to the sampling signals. Since this integrated feature value also reflects a movement of the raindrop, the condition of the sensing surface can be estimated with a simpler logic and utilized for controlling the wiper.

Moreover, the raindrop size may be estimated from jiggling of the raindrop in an integrated manner. Accordingly, the condition of the sensing surface can be estimated with a simpler logic and utilized for controlling the wiper.

In addition, since the condition of the sensing surface can be estimated with a simple logic, a high speed processing becomes easier. It also is possible to provide a sensing device without a large amount of hardware resources.

The invention claimed is:

1. A sensing device in which a light emitted from a light-emitting member is introduced to a transparent plate, reflected by a sensing surface of the transparent plate and then received by a photo-detector, thereby detecting a condition of an object that has impacted on the sensing surface, the sensing device comprising:

a sampling part for sampling signals from the photo-detector;

a fluctuation sensing part for sensing a fluctuation of the signals from the photo-detector; and a judging part for estimating a size of a liquid drop as the object on the sensing surface based on a changing pattern of the signal fluctuation sensed by the fluctuation sensing part; wherein the fluctuation sensing part comprises a part for compressing signals in a sequence of the sampled signals when they continue within a single segment, where a plurality of the segments defined by a plurality of predetermined values are set with respect to an input signal, and a part for calculating a compressibility from the number of the sampled signals to be compressed by the part for compressing the signals and the number of the sampled signals that have been compressed thereby, and senses a period of the signal fluctuation from a time the signal fluctuation is sensed to a time an attenuation of a degree of the signal fluctuation to a predetermined degree is sensed based on the compressibility, the fluctuation sensing part further comprises a part for calculating the number of times that signals in the sequence of the sampled signals change from one segment to another within a predetermined period and a part for calculating a direction of increase or decrease of the change and a change amount thereof, and senses a degree of the signal fluctuation based on the direction of increase or decrease of the change and the change amount, the changing pattern of the signal fluctuation used in the judging next is a changing pattern of the period of the signal fluctuation sensed in the fluctuation sensing part, and the changing pattern of the signal fluctuation used in the judging part is a changing pattern of the degree of the signal fluctuation sensed in the fluctuations sensing part.

2. The sensing device according to claim 1, wherein the fluctuation sensing part comprises a part for sensing a period of the signal fluctuation from a time the signal fluctuation is sensed to a time an attenuation of a degree of the signal fluctuation to a predetermined degree is sensed, and the changing pattern of the signal fluctuation used in the judging part is a changing pattern of the period of the signal fluctuation sensed in the fluctuation sensing part.

3. The sensing device according to claim 1,
wherein the fluctuation sensing part comprises a part for sensing a degree of the signal fluctuation, and
the changing pattern of the signal fluctuation used in the judging part is a changing pattern of the degree of the signal fluctuation sensed in the fluctuation sensing part.

4. The sensing device according to claim 2,
wherein the fluctuation sensing part comprises, as the part for sensing the period of the signal fluctuation, a part for compressing signals in a sequence of the sampled signals when they continue within a single segment, where a plurality of the segments defined by a plurality of predetermined values are set with respect to an input signal, and a part for calculating a compressibility from the number of the sampled signals to be compressed by the part for compressing the signals and to number of the sampled signals that have been compressed thereby, and
the judging part uses the compressibility as a representation of the changing pattern of the period of the signal fluctuation so as to judge the object on the sensing surface.

5. The sensing device according to claim 3,
wherein the fluctuation sensing part comprises, as the part for sensing the degree of the signal fluctuation, a part for calculating the number of times tat signals in a sequence of the sampled signals change from one segment to another within a predetermined period, where a plurality of the segments defined by a plurality of predetermined values are set with respect to an input signal, and a part for calculating a direction of increase or decrease of the change and a change amount thereof, and
the judging part uses the number of times, the direction and the change amount as a representation of the changing pattern of the degree of the signal fluctuation so as to judge the object on the sensing surface.

6. The sensing device according to claim 1, further comprising a part for removing a noise from the signals from the photo-detector.

7. The sensing device according to claim 1, wherein a spike noise is removed in advance from the signals that are inputted to the part for removing the noise.

8. The sensing device according to claim 6, wherein in the part for removing the noise, a predetermined number of samples of sequentially inputted signals averaged.

9. The sensing device according to claim 1, wherein a raindrop is sensed.

10. A wiper controlling apparatus for controlling a wiper based on a judgement made by the sensing device according to claim 9.

11. A sensing method in which a light emitted from a light-emitting member is introduced to a transparent plate, reflected by a sensing surface of the transparent plate and then received by a photo-detector, thereby detecting a condition of an object tat has impacted on the sensing surface, the sensing method comprising the operations of:
sampling signals from the photo-detector;
sensing a fluctuation of the signals from the photo-detector; and estimating a size of a liquid drop as the object on the sensing surface based on a changing pattern of the sensed signal fluctuation; and further comprising the operations of in the operation of sensing the fluctuation of the signals, compressing signals in a sequence of the sampled signals when they continue within a single segment, where a plurality of the segments defined by a plurality of predetermined values are set with respect to an input signal, calculating a compressibility from the number of the sampled signals to be compressed and the number of the sampled signals that have been compressed, and sensing a period of the signal fluctuation from a time the signal fluctuation is sensed to a time that an attenuation of a degree of the signal fluctuation to a predetermined degree is sensed based on the compressibility, and in the operation of sensing the fluctuation of the signals, calculating the number of times that signals in the sequence of the sampled signals change from one segment to another within a predetermined period, calculating a direction of increase or decrease of the change and a change amount thereof, and sensing a degree of the signal fluctuation based on thee direction of increase or decrease of the change and the change amount, wherein the changing pattern of the signal fluctuation used in the operation of judging the object is a changing pattern of the period of the signal fluctuation sensed in the operation of sensing the fluctuation, and the changing pattern of the signal fluctuation used in the operation of judging the object is a changing pattern of the degree of the signal fluctuation sensed in the operation of sensing the fluctuation.

12. The sensing method according to claim 11, further comprising the operation of sensing a period from a time the signal fluctuation is sensed to a time an attenuation of a degree of the signal fluctuation to a predetermined degree is sensed in the operation of sensing the fluctuation of the signals, wherein the changing pattern of the signal fluctuation used in the operation of judging the object is a changing pattern of the period of the signal fluctuation sensed in the operation of sensing the fluctuation.

13. The sensing method according to claim 11, further comprising the operation of sensing a degree of the fluctuation of the signals from the photo-detector is the operation of sensing the fluctuation of the signals, wherein the changing pattern of the signal fluctuation used in the operation of judging the object is a changing pattern of the degree of the signal fluctuation sensed in the operation of sensing the fluctuation.

14. The sensing method according to claim 12, further comprising the operations of as the operation of sensing the period of the signal fluctuation, compressing signals in the sequence of the sampled signals when they continue within a single segment, where a plurality of the segments defined by a plurality of predetermined values are set with respect to an input signal, and calculating a compressibility from the number of the sampled signals to be compressed and the number of the sampled signals that have been compressed, and in the operation of judging the object, using the compressibility as a representation of the changing pattern of the period of the signal fluctuation so as to judge the object on the sensing surface.

15. The sensing method according to claim 13, further comprising the operation of
- as the operation of sensing the degree of the signal fluctuation, calculating the number of times that signals in a sequence of the sampled signals change from one segment to another within a predetermined period, where a plurality of the segments defined by a plurality of predetermined values are set with respect to an input signal, a direction of increase or decrease of the change and a change amount thereof, and
- in the operation of judging the object, using the number of times, the direction and the change amount as a representation of the changing pattern of the degree of the signal fluctuation so as to judge the object on the sensing surface.

16. The sensing method according to claim 11, further comprising the operation of removing a noise from the signals from the photo-detector.

17. The sensing method according to claim 11, wherein a spike noise is removed in advance from the signals that are inputted in the operation of removing the noise.

18. The sensing method according to claim 16, wherein, in the operation of removing the noise, a predetermined number of samples of sequentially inputted signals are averaged.

19. The sensing method according to claim 11, wherein a raindrop is sensed.

20. A wiper controlling apparatus for controlling a wiper based on a judgement made by the sensing method according to claim 19.

* * * * *